H. KATZBERG.
FIVE HORSE EVENER.
APPLICATION FILED NOV. 10, 1917.
1,271,910.
Patented July 9, 1918.
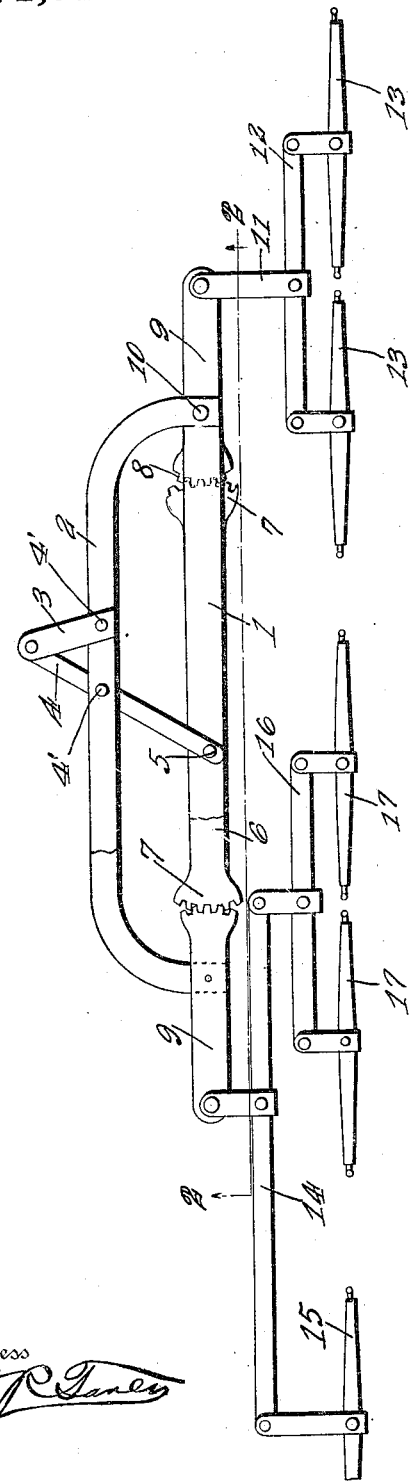
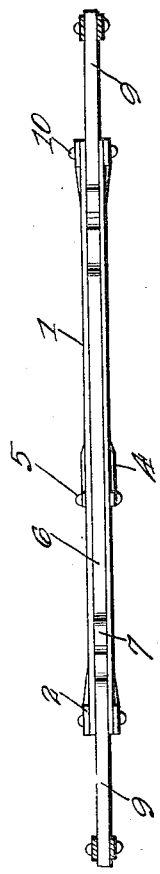
H. Katzberg
Inventor

UNITED STATES PATENT OFFICE.

HERMAN KATZBERG, OF PROSSER, NEBRASKA.

FIVE-HORSE EVENER.

1,271,910. Specification of Letters Patent. Patented July 9, 1918.

Application filed November 10, 1917. Serial No. 201,290.

*To all whom it may concern:*

Be it known that I, HERMAN KATZBERG, a citizen of the United States, residing at Prosser, in the county of Adams and State of Nebraska, have invented a new and useful Five-Horse Evener, of which the following is a specification.

This invention relates to a draft equalizer particularly designed for use with five draft animals whereby the draft upon each of the animals will be equalized. One of the objects is to provide simple compact and durable means of this character which will not readily get out of order and which will operate efficiently for the purposes intended.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown.

In said drawings:—

Figure 1 is a plan view of the draft equalizer with portions broken away.

Fig. 2 is a section on line 2—2 of Fig. 1.

Referring to the figures by characters of reference 1 designates a whiffle tree made up of upper and lower sections spaced apart, said sections being connected to a curved beam 2 arranged back of the whiffle tree. This beam is made up of upper and lower sections spaced apart and between the ends of which are extended the end portions of the whiffletree 1. A brace strip 3 is secured on the beam 2 by a rivet 4' and is fastened at its rear end to another brace strip 4 which extends between the upper and lower members of the beam 2 and has a forked front end which embraces the whiffletree and is fastened thereto by a bolt 5. The strip 4 is secured to the beam 2 by a rivet 4' or the like and the two brace strips 3 and 4 converge rearwardly to their point of connection. The bolt 5 which secures the brace strip 4 to the whiffle tree constitutes a pivot on which is mounted a lever 6 provided, at each end, with a segmental gear 7. Each of these gears 7 meshes with a segmental gear 8 formed at the inner end of a lever 9 which is fulcrumed upon a bolt 10 extending through the end portion of the whiffle tree and which bolt also serves to secure the beam 2 to the whiffle tree. Secured to the outer end of one of the levers 9 is a clevis 11 to which is connected a double tree 12 having swingle trees 13 thereon. Another double tree 14 is connected to the outer end of the other lever 9 and this double tree has one arm longer than the other. To the long arm is connected a swingle tree 15 while to the short arm is connected a double tree 16 having swingle trees 17. All of the swingle trees are in line and the levers 6 and 9 and the double trees 12 and 14 are so proportioned that when five draft animals are connected to the swingle trees, the load which is attached to the rear ends of the braces 3 and 4 will be evenly distributed to them.

What is claimed is:—

1. A draft equalizer including a whiffle tree formed of spaced upper and lower members, a lever fulcrumed between the upper and lower members of the whiffle tree and having a segmental gear at each end, levers fulcrumed in the end portions of the whiffle tree and having segmental gears meshing with the respective segmental gears of the first named lever, and trees connected to the outer ends of the last named levers.

2. A draft equalizer including a whiffle tree made up of upper and lower spaced members, a beam secured to said members, a central lever fulcrumed between the members of the whiffle tree and having a segmental gear at each end, a brace connected to the beam and whiffle tree, a fastening element extending through the brace and whiffle tree and constituting the fulcrum of the lever, fastening means extending through the ends of the beam and the whiffle tree, end levers fulcrumed on said fastening means and having segmental gears constantly in mesh with the gears at the ends of the central lever, and trees connected to the outer ends of the end levers.

In testimony that I claim the foregoing as my own, I have hereto affixed my signature in the presence of two witnesses.

HERMAN KATZBERG.

Witnesses:
W. P. W. HNARY,
R. K. POLENSKE.

Copies of this patent may be obtained for five cents each, by addressing the "Commissioner of Patents, Washington, D. C."